（12） United States Patent
Park et al.

(10) Patent No.: US 9,615,129 B2
(45) Date of Patent: Apr. 4, 2017

(54) METHOD, SYSTEM, AND APPARATUS FOR SYNCHRONIZING MULTIPLE DEVICES WITH EACH OTHER

(71) Applicant: KT CORPORATION, Seongnam (KR)

(72) Inventors: Joon-Woo Park, Daejeon (KR); Hyun-Sook Kim, Seoul (KR); Sung-En Park, Daejeon (KR); Seung-Ho Yeon, Yongin-si (KR)

(73) Assignee: KT Corporation, Seongnam (KR)

( * ) Notice: Subject to any disclaimer, the term of this patent is extended or adjusted under 35 U.S.C. 154(b) by 0 days.

(21) Appl. No.: 13/679,342

(22) Filed: Nov. 16, 2012

(65) Prior Publication Data

US 2013/0125178 A1    May 16, 2013

(30) Foreign Application Priority Data

Nov. 16, 2011  (KR) .................. 10-2011-0119693

(51) Int. Cl.
*H04N 7/18*        (2006.01)
*H04N 21/436*      (2011.01)
(Continued)

(52) U.S. Cl.
CPC ... *H04N 21/43615* (2013.01); *H04N 21/2353* (2013.01); *H04N 21/23418* (2013.01);
(Continued)

(58) Field of Classification Search
CPC .......... H04N 21/4126; H04N 21/4307; H04N 21/41407; H04N 21/4222; H04N 21/435; H04N 21/47202
(Continued)

(56) References Cited

U.S. PATENT DOCUMENTS 7,246,367 B2 *  7/2007  Iivonen ..................... 725/102
7,669,219 B2 *  2/2010  Scott, III .................... 725/89
(Continued)

FOREIGN PATENT DOCUMENTS

KR        100881723 B1     2/2009
KR        1020100003116 A  1/2010
(Continued)

OTHER PUBLICATIONS

Messer, Alan; Kunjithapatham, Anugeetha; Sheshagiri, Mithun; Song, Henry; Kumar, Praveen; Nguyen, Phuong; Hoon Yi, Kyoung; InterPlay: A Middleware for Seamless Device Integration and Task Orchestration in a Networked Home, Pervasive Computing and Communications, 2006. PerCom 2006. Fourth Annual IEEE International Conference.*

*Primary Examiner* — Nathan Flynn
*Assistant Examiner* — Cynthia Fogg
(74) *Attorney, Agent, or Firm* — Sughrue Mion, PLLC

(57) ABSTRACT

A method of synchronizing multiple devices with each other is provided. The method includes generating first interworking information corresponding to a first device, transmitting the generated first interworking information to the first device, receiving second interworking information from a second device and if the first interworking information corresponds to the second interworking information, synchronizing the first device with the second device, wherein the second device is configured to display broadcasting related information generated based on a broadcasting schedule provided by a broadcasting transmission apparatus that transmits broadcasting contents to the first device.

20 Claims, 5 Drawing Sheets

(51) Int. Cl.
*H04N 21/234* (2011.01)
*H04N 21/235* (2011.01)
*H04N 21/258* (2011.01)
*H04N 21/266* (2011.01)
*H04N 21/81* (2011.01)

(52) U.S. Cl.
CPC . *H04N 21/25891* (2013.01); *H04N 21/26603* (2013.01); *H04N 21/812* (2013.01)

(58) Field of Classification Search
USPC .......................................................... 725/80
See application file for complete search history.

(56) References Cited

U.S. PATENT DOCUMENTS

| | | | |
|---|---|---|---|
| 2004/0098754 A1* | 5/2004 | Vella et al. ................... | 725/135 |
| 2006/0064734 A1* | 3/2006 | Ma ................................ | 725/136 |
| 2006/0265731 A1* | 11/2006 | Matsuda ............. | G06F 17/3079 725/131 |
| 2007/0067808 A1* | 3/2007 | DaCosta ......................... | 725/62 |
| 2007/0234213 A1* | 10/2007 | Krikorian et al. ............. | 715/716 |
| 2008/0288600 A1* | 11/2008 | Clark ............................. | 709/206 |
| 2009/0044229 A1* | 2/2009 | Taylor .............................. | 725/62 |
| 2009/0251599 A1* | 10/2009 | Kashyap et al. ............... | 348/500 |
| 2010/0089996 A1* | 4/2010 | Koplar ........................... | 235/375 |
| 2010/0131972 A1* | 5/2010 | Byun .............................. | 725/25 |
| 2010/0218211 A1* | 8/2010 | Herigstad et al. ............. | 725/34 |
| 2010/0229197 A1* | 9/2010 | Yi et al. .......................... | 725/40 |
| 2010/0242071 A1* | 9/2010 | Hwang et al. ................. | 725/88 |
| 2011/0209191 A1* | 8/2011 | Shah .............................. | 725/136 |
| 2011/0307931 A1* | 12/2011 | Shuster ............ | G06F 17/30817 725/105 |
| 2012/0159563 A1* | 6/2012 | Gomez ............ | H04N 21/4223 725/132 |
| 2014/0229975 A1* | 8/2014 | Bolden ............ | H04N 21/4126 725/32 |

FOREIGN PATENT DOCUMENTS

KR 10-2011-0059475 A 6/2011
KR 10-2011-0081537 A 7/2011

* cited by examiner

METHOD, SYSTEM, AND APPARATUS FOR SYNCHRONIZING MULTIPLE DEVICES WITH EACH OTHER

CROSS-REFERENCE TO RELATED PATENT APPLICATION

This application claims priority from the Korean Patent Application No. 10-2011-0119693, filed on Nov. 16, 2011 in the Korean Intellectual Property Office, the entire disclosure of which is incorporated herein by reference in its entirety.

BACKGROUND

1. Field

Exemplary embodiments broadly relate to a method and an apparatus for synchronizing multiple devices with each other.

2. Description of the Related Art

Recently, high-speed communication networks have propagated and broadcasting technologies have gradually amalgamated with communication technologies. For this reason, an Internet Protocol Television (IPTV) that enables a user to selectively receive contents has been emerging as the biggest issue in the broadcasting industry.

In a related art, if a user requests information, such as detailed information or additional information, related to a broadcast program provided through a TV while watching the TV, the requested information can be provided together with the broadcasting contents through the TV or a display device connected to the TV.

Korean Patent Laid-open Publication No. 2011-0059475 describes an apparatus and a method for providing a contents user with additional contents through a multimedia driving device or a separate device connected thereto by synchronizing main contents provided from a contents providing apparatus, and Korean Patent Laid-open Publication No. 2011-0081537 describes an apparatus and a method for providing a user with a two-way service and an additional service corresponding to contents played by a first device through a second device and for controlling a playing operation by synchronizing the second device with a contents playing operation of the first device and providing a control signal to the first device in response to a user's operation.

Further, recent advances in technology make it possible to produce various kinds of devices and a single user can use multiple devices. In particular, recent advances in wire/wireless network communication technology make it possible to have wire communication or wireless communication among multiple devices. Therefore, a user can be provided easily with various kinds of information by using various devices through wire communication or wireless communication.

As described above, since a single user can use multiple devices, there is an increasing demand for a service of providing contents by connecting multiple devices.

SUMMARY

Accordingly, it is an aspect to provide a method and an apparatus for interworking and synchronizing multiple devices with each other by connecting the multiple devices.

According to an aspect of an exemplary embodiment, there is provided a method of synchronizing multiple devices with each other. The method includes generating first interworking information corresponding to a first device, transmitting the generated first interworking information to the first device, receiving second interworking information from a second device and if the first interworking information corresponds to the second interworking information, synchronizing the first device with the second device, wherein the second device is configured to display first information generated based on a schedule provided by an apparatus transmission apparatus that transmits contents to the first device.

According to another aspect of an exemplary embodiment, there is provided a broadcasting service apparatus for synchronizing multiple devices with each other. The apparatus includes a generator configured to generate first interworking information corresponding to a first device that reproduces contents and configured to transmit the first interworking information to the first device, a device interworker configured to interwork the first device with a second device if second interworking information received from the second device corresponds to the first interworking information and a synchronizer configured to synchronize the first device with the second device, wherein the second device is configured to display first information generated based on a schedule provided by an apparatus that transmits contents to the first device.

According to another aspect of an exemplary embodiment, there is provided a system of synchronizing multiple devices with each other. The system comprises: a first device which displays first contents; a second device which displays second contents; a third device which generates first interworking information corresponding to the first device, transmits the generated first interworking information to the first device, and receives second interworking information from the second device; and a fourth device which transmits the first contents to the first device, wherein if the first interworking information corresponds to the second interworking information, the first device is synchronized with the second device, and wherein the second device is configured to display first information generated based on a schedule provided by the fourth device.

In exemplary embodiments, since multiple devices used by a single user are interworked and synchronized with each other, it is possible to provide contents to the user by connecting the multiple devices.

BRIEF DESCRIPTION OF THE DRAWINGS

Non-limiting and non-exhaustive embodiments will be described in conjunction with the accompanying drawings. Understanding that these drawings depict only several exemplary embodiments according to the disclosure and are, therefore, not to be intended to limit its scope, the disclosure will be described with specificity and detail through use of the accompanying drawings, in which.

DETAILED DESCRIPTION OF EXEMPLARY EMBODIMENTS

Figure 1:
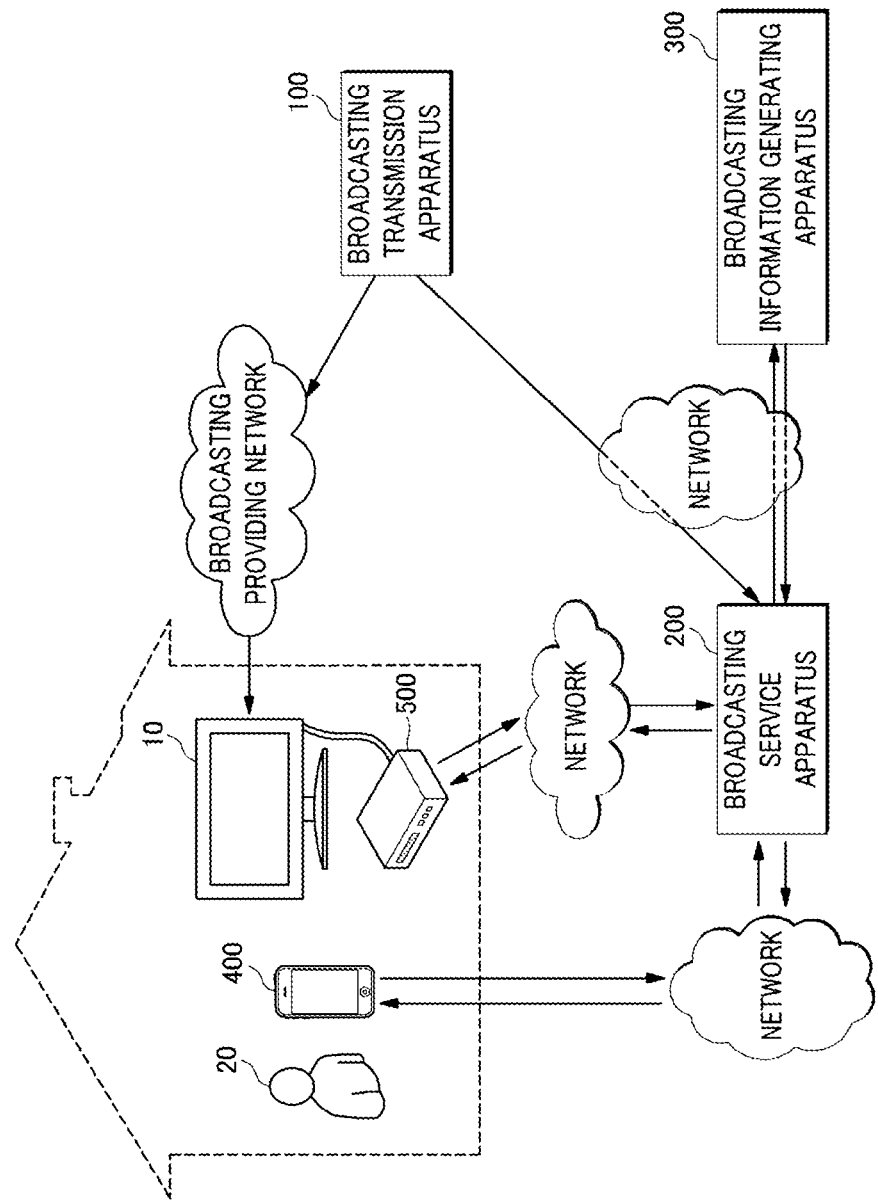
FIG. 1 is a view illustrating a configuration of a synchronizing system according to an exemplary embodiment.

Hereinafter, exemplary embodiments will be described in detail with reference to the accompanying drawings to be readily implemented by those skilled in the art. However, it is to be noted that the present disclosure is not limited to the exemplary embodiments, but can be realized in various other ways. In the drawings, certain parts not directly relevant to the description of exemplary embodiments are omitted to enhance the clarity of the drawings, and like reference numerals denote like parts throughout the whole document.

Throughout the whole document, the terms "connected to" or "coupled to" are used to designate a connection or coupling of one element to another element, and include both a case where an element is "directly connected or coupled to" another element and a case where an element is "electronically connected or coupled to" another element via still another element. Further, each of the terms "comprises," "includes," "comprising," and "including," as used in the present disclosure, is defined such that one or more other components, steps, operations, and/or the existence or addition of elements are not excluded in addition to the described components, steps, operations and/or elements.

Hereinafter, exemplary embodiments will be explained in detail with reference to the accompanying drawings.

FIG. 1 is a view illustrating a configuration of a synchronizing system according to an exemplary embodiment.

In an exemplary embodiment, a broadcasting transmission apparatus 100 transmits broadcasting contents, over a broadcast providing network, to a first device 500 for reproducing the broadcasting contents through display device 10, such as a TV, connected with the first device 500. The first device may be a settop-box (STB) 500 of a user 20, and the display device 10 of the user 20 may receive the broadcasting contents directly from the broadcasting transmission apparatus 100 to provide it to the user 20.

The broadcasting transmission apparatus 100 transmits, to a broadcasting service apparatus 200, a broadcasting schedule of the broadcasting contents transmitted to the display device 10.

The broadcasting service apparatus 200 transmits the broadcasting schedule received from the broadcasting transmission apparatus 100 to a broadcasting information generating apparatus 300 in response to a request of the broadcasting information generating apparatus 300.

The broadcasting service apparatus 200 receives information related to a broadcasting contents included in the broadcasting schedule from the broadcasting information generating apparatus 300 and generates contents information of the broadcasting contents by using the received information related to the broadcasting contents. Further, the broadcasting service apparatus 200 stores the generated contents information by matching the broadcasting contents and the broadcasting schedule.

The broadcasting service apparatus 200 provides the contents information to a second device 400 in response to a request of the second device 400. The second device may be a mobile device 400 of the user 20.

Further, the broadcasting service apparatus 200 generates first interworking information corresponding to the STB 500 and transmits the first interworking information to the STB 500. If second interworking information received from the mobile device 400 corresponds to the first interworking information transmitted to the STB 500, the mobile device 400 can be interworked with the STB 500.

The broadcasting service apparatus 200 receives a request of the mobile device 400 for reproducing information of the broadcasting contents being reproduced by the display device 10, such as a TV, through the STB 500 and provides contents information including the requested reproduction information to the mobile device 400.

In this case, the mobile device 400 provides the reproduction information received from the broadcasting service apparatus 200 to the user, and receives a user request for additional information of the broadcasting contents being reproduced through the STB 500.

Further, the broadcasting service apparatus 200 receives a signal related to selecting specific broadcasting contents, from the mobile device 400 and transmits a control signal to the STB 500 so as to reproduce the broadcasting contents selected through the STB 500 interworked with the mobile device 400.

Therefore, the user selects broadcasting contents through the mobile device 400 and reproduces the selected broadcasting contents on the display device 10, such as a TV, through the STB 500.

The user 20 requests additional information from the broadcasting service apparatus 200 through the mobile device 400 in order to receive information of a particular scene or an object that appeared in the broadcasting contents being reproduced on the display device 10, such as a TV. The mobile device 400 may include an application for requesting and receiving the additional information from the broadcasting service apparatus 200.

The broadcasting information generating apparatus 300 receives the broadcasting schedule from the broadcasting service apparatus 200 and generates broadcasting related information related to a broadcasting contents provided to the user by the broadcasting transmission apparatus 100 by using the received broadcasting schedule.

By way of example, if drama contents is provided to the user by the broadcasting transmission apparatus 100, the broadcasting information generating apparatus 300 generates not only information of characters, places, and cars shown in the drama contents but also broadcasting related information including information related to pay per lead (PPL) advertisement of products and services shown in the drama contents.

The broadcasting related information generated by the broadcasting information generating apparatus 300 can be synchronized with a broadcast reproducing time included in the broadcasting schedule. In other words, the broadcasting related information may be generated such that contents to be provided are changed with a lapse of time.

For example, each time the people appearing in the drama contents are changed, items to be provided to the user or other people in the broadcasting related information may also be changed based on the people that appear in the drama contents.

That is, the broadcasting information generation apparatus 300 may generate the broadcasting related information such that when an actor "A" appears in the drama contents, information about the actor "A" is provided using the broadcasting related information, and when an actor "B" appears as the drama contents are reproduced again, information about the actor "B" is provided using the broadcasting related information.

The broadcasting information generation apparatus 300 provides the generated broadcasting related information to the broadcasting service apparatus 200 while matching the broadcasting related information with its corresponding broadcasting contents. The broadcasting information generation apparatus 300 may include devices, a producer producing broadcasting contents or advertisement contents, an advertisement producer providing advertisement using the broadcasting contents, and a user registering his/her comments in video on demand (VOD) contents.

The mobile device 400 provides the contents information received from the broadcasting service apparatus 200 to the user 20 by displaying it on its screen. The user 20 may request additional information of a particular scene or object from the broadcasting service apparatus 200 through the mobile device 400.

By way of example, the contents information may contain one or more icons including images, texts, and the like. The user 20 may select an icon, of which the user 20 wants additional information, from the icons contained in the contents information and may be provided with the additional information from the broadcasting service apparatus 200 through the mobile device 400.

Figure 2:
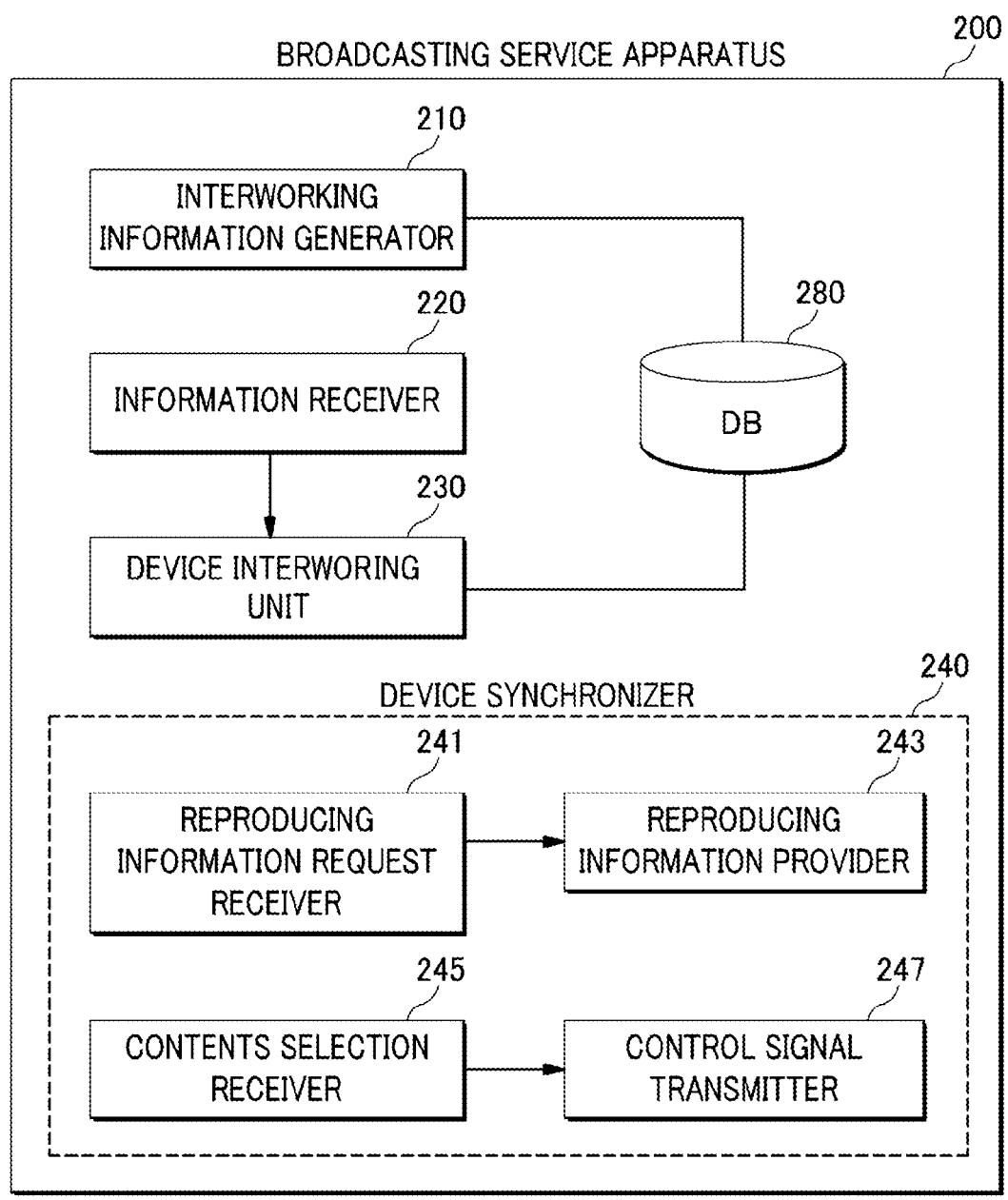
FIG. 2 is a block diagram illustrating a broadcasting service apparatus according to an exemplary embodiment.

FIG. 2 is a block diagram illustrating a broadcasting service apparatus according to an exemplary embodiment.

The broadcasting service apparatus 200 includes an interworking information generator 210, an information receiver 220, a device interworking unit 230, a device synchronizer 240, and a database 280. The device synchronizer 240 includes a reproduction information request receiver 241, a reproduction information provider 243, a contents selection receiver 245 and a control signal transmitter 247.

The interworking information generator 210 generates first interworking information corresponding to a broadcasting contents reproducing device, such as a STB, and transmits the generated first interworking information to a STB. The first interworking information may include numbers, texts, and images including specifically designed codes, such as barcodes and QR codes.

The first interworking information generated by the interworking information generator 210 may include identification information for identifying each STB 500 and may be displayed together with a broadcasting contents reproduced through a STB 500.

The information receiver 220 receives information of STB 500 from a user device 400, i.e., a mobile device, such as a smart phone, a PDA (Personal Digital Assistant), and a tablet PC. That is, the information receiver 220 receives, from the mobile device, the information of STB to be interworked with the mobile device, and the information of STB includes second interworking information.

If the second interworking information included in the information of STB 500 received by the information receiver 220 from the mobile device corresponds to the first interworking information generated by the interworking information generator 210, the device interworking unit 230 interworks the mobile device with the STB 500.

By way of example, the device interworking unit 230 determines whether or not the second interworking information received from the mobile device corresponds to the first interworking information generated by the interworking information generator 210, and if the interworking information received from the mobile device corresponds to the first interworking information, the device interworking unit 230 stores information of the mobile device interworked with the STB 500 in the database 280.

The reproduction information request receiver 241 receives a request of the mobile device for reproduction information of a broadcasting contents being reproduced through the STB 500. That is, the reproduction information request receiver 241 receives the request of the mobile device for the reproduction information, such as channel information and contents identification information, of the broadcasting contents being reproduced through the STB 500 interworked with the mobile device.

The reproduction information provider 243 transmits, to the mobile device, contents information including the reproduction information, such as the channel information and the contents identification information, of the broadcasting contents being reproduced through the STB interworked with the mobile device in response to the reproduction information request received from the mobile device.

The mobile device 400 displays contents information or additional information of the broadcasting contents being reproduced through the STB 500 by using the received broadcasting related information so as to provide them to the user 20.

The contents selection receiver 245 receives, from the mobile device 400, contents selection information for selecting specific contents. The contents selection information may include reproduction information, such as channel information, of one of multiple broadcasting contents which can be currently reproduced through the STB 500.

That is, the user 20 can select any one of the multiple broadcasting contents being transmitted by a broadcasting transmission apparatus 100 by using the broadcasting related information displayed on the mobile device. The mobile device 400 transmits contents selection information of the broadcasting contents selected by the user 20 to the broadcasting service apparatus 200. The contents selection receiver 245 receives the contents selection information transmitted from the mobile device 400.

The control signal transmitter 247 generates a control signal for controlling the STB 500 interworked with the mobile device 400 based on the contents selection information received by the contents selection receiver 245 and transmits the generated control signal to the STB 500.

That is, the control signal transmitter 247 generates the control signal for controlling the STB 500 interworked with the mobile device 400 to reproduce broadcasting contents corresponding to channel information contained in the received contents selection information or contents information by using the channel information or the contents information and the control signal transmitter 247 transmits the generated control signal to the STB 500.

The STB 500 reproduces the broadcasting contents selected by the user 20 through the mobile device 400 based on the control signal received from the control signal transmitter 247 so as to provide it to the user 20.

Figure 3:
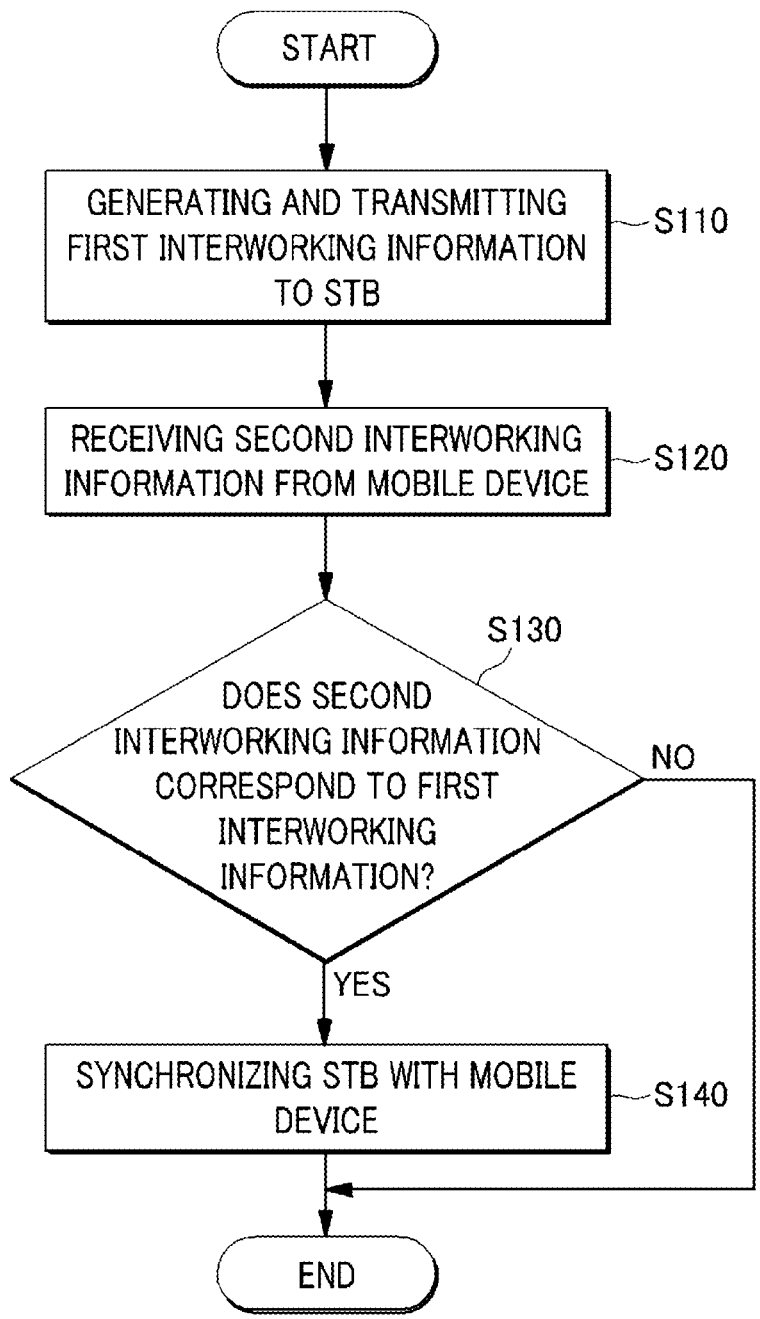
FIG. 3 is a flow diagram illustrating a synchronizing method according to an exemplary embodiment.

FIG. 3 is a flow diagram illustrating a synchronizing method according to an exemplary embodiment.

In operation S110, a broadcasting service apparatus 200 generates first interworking information corresponding to a first device, for example, a STB 500, which is preregistered at the broadcasting service apparatus 200 and transmits the generated first interworking information to the corresponded STB 500.

Multiple STBs may be preregistered at the broadcasting service apparatus 200. In this case, the broadcasting service apparatus 200 generates and transmits first interworking information corresponding to each of the multiple STBs. The generated first interworking information may include information for identifying each STB.

In operation S120, the broadcasting service apparatus 200 receives second interworking information for synchronizing with a mobile device 400 from the mobile device 400. That is, the broadcasting service apparatus 200 receives, from the mobile device 400, the second interworking information of a STB to be interworked with the mobile device 400.

In operation S130, the broadcasting service apparatus 200 determines whether or not the second interworking information received from the mobile device 400 is appropriate, i.e., whether or not the second interworking information corresponds to one or more STBs preregistered at the broadcasting service apparatus.

In operation S140, if it is determined that the second interworking information received from the mobile device 400 is appropriate in operation S130, the broadcasting service apparatus 200 interworks information of the mobile device 400 with information of a STB 500 and the broadcasting service apparatus 200 synchronizes the mobile device 400 with the STB 500 by using the interworked information of the mobile device 400 and STB 500.

A method of synchronizing the mobile device with the STB will be explained with reference to FIGS. 4 and 5.

Figure 4:
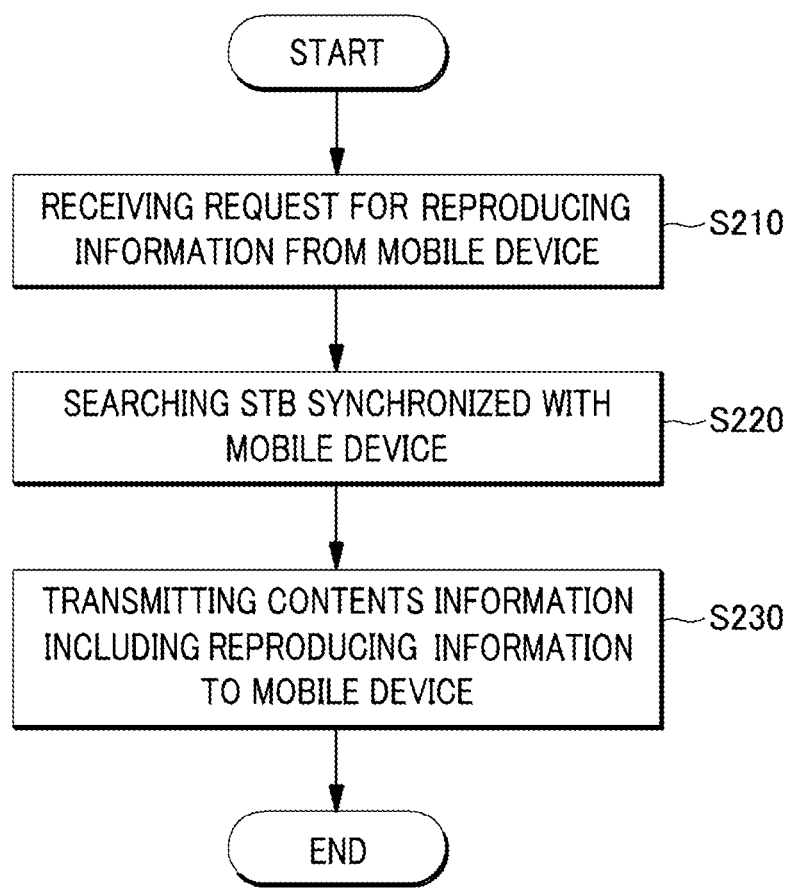
FIG. 4 is a flow diagram illustrating a method of providing reproducing information according to an exemplary embodiment.

FIG. 4 is a flow diagram illustrating a method of providing reproduction information according to an exemplary embodiment.

In operation S210, a broadcasting service apparatus 200 receives a request of a mobile device 400 for reproduction information, such as identification information or channel information, of a broadcasting contents being reproduced through a STB 500 interworked with the mobile device 400.

In operation S220, the broadcasting service apparatus 200 searches the STB 500 interworked with the mobile device 400 to acquire the reproduction information of the broadcasting contents being reproduced by the searched STB 500. The broadcasting service apparatus 200 may acquire the reproduction information based on information received from the STB 500 or may acquire the reproduction information of the STB through a broadcasting transmission apparatus 100 that provides broadcasting contents to the STB 500.

In operation S230, the broadcasting service apparatus 200 transmits contents information including the reproduction information acquired in operation S230 to the mobile device 400 that requests the reproduction information in operation S210.

Figure 5:
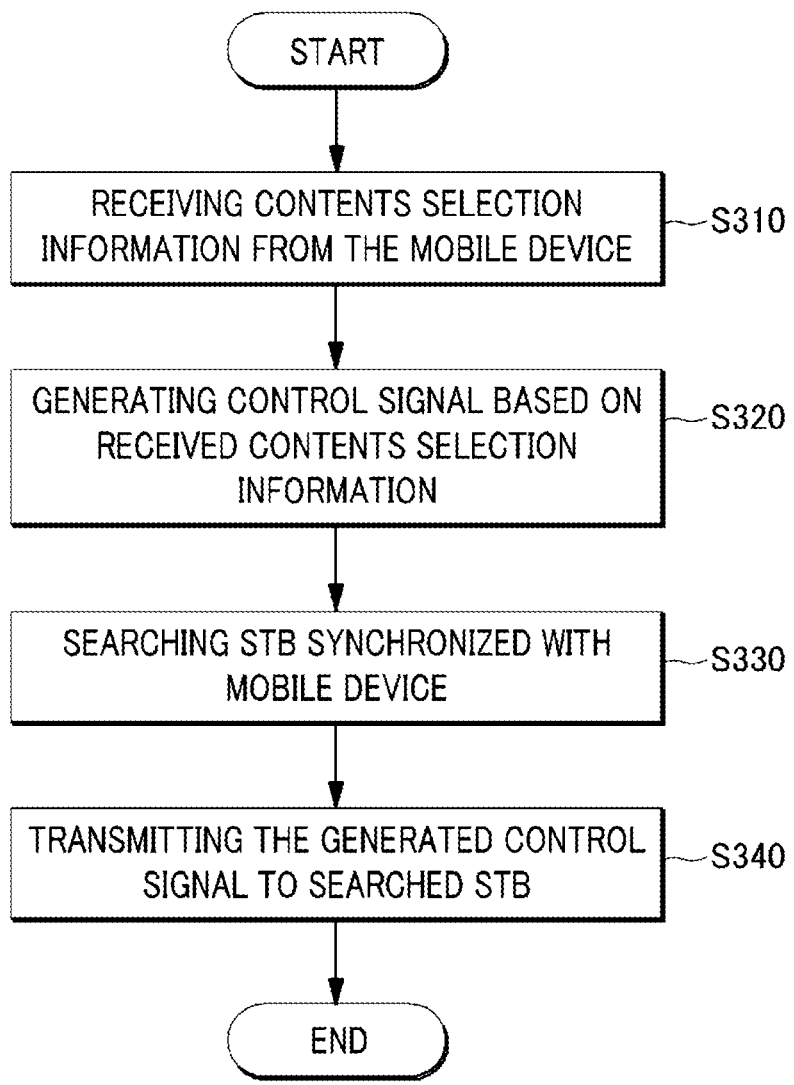
FIG. 5 is a flow diagram illustrating a method of providing a control signal according to an exemplary embodiment.

FIG. 5 is a flow diagram illustrating a method of providing a control signal according to an exemplary embodiment.

In operation S310, a broadcasting service apparatus 200 receives, from a mobile device 400, contents selection information including information of broadcasting contents selected by a user 20. The contents selection information may include identification information or channel information of the broadcasting contents selected by the user 20.

In operation S320, the broadcasting service apparatus 200 generates a control signal for controlling a STB 500 interworked with the mobile device 400 to reproduce the selected broadcasting contents or a channel included in the contents selection information by using the contents selection information received in operation S310.

In operation S330, the broadcasting service apparatus 200 searches the STB interworked with the mobile device 400.

In operation S340, the broadcasting service apparatus 200 transmits the control signal generated in operation S320 to the STB 500 searched in operation S330. The STB 500 reproduces the broadcasting contents or channel selected by the user 20 through the mobile device 400 based on the received control signal.

The exemplary embodiment can be embodied in a storage medium including instruction codes executable by a computer such as a program module executed by the computer. Besides, the data structure according to the embodiment of the present disclosure can be stored in the storage medium executable by the computer. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described exemplary embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the exemplary embodiments. It shall be understood that all modifications and exemplary embodiments conceived from the meaning and scope of the claims and their equivalents are included in the scope of the present disclosure.

What is claimed is:

1. A method of interworking multiple devices with each other, the method comprising:
   generating first interworking information corresponding to a first device;
   transmitting the generated first interworking information to the first device, wherein the first interworking information is configured to be displayed by the first device;
   receiving second interworking information from a second device, wherein the second interworking information is generated by the second device based on the displayed first interworking information; and
   if the first interworking information corresponds to the second interworking information, interworking the first device with the second device,
   wherein the second device is configured to display first information comprising broadcasting related information generated based on a schedule provided by a first apparatus that transmits contents to the first device,
   wherein a second apparatus performs the generating operation, the transmitting operation, and the receiving operation, and
   wherein the first interworking information and the second interworking information comprise at least one from among numbers, texts, and images, and
   wherein the first information is generated by a third apparatus.

2. The method of claim 1, wherein the interworking the first device with the second device comprises:
   receiving, from the second device, a request for second information of contents being reproduced on the first device; and
   transmitting, to the second device, third information comprising the second information of the contents in response to the received request for the second information.

3. The method of claim 2, wherein the second information comprises reproduction information and the third information comprises contents information.

4. The method of claim 1, wherein the interworking the first device with the second device comprises:
   receiving second information from the second device;
   generating a signal for controlling the first device based on the received second information; and
   transmitting the generated signal to the first device.

5. The method of claim 4, wherein the transmitted signal is configured to allow the first device to reproduce contents corresponding to the received second information.

6. The method of claim 4, wherein the second information comprises contents selection information and the signal is a control signal.

7. The method of claim 1, wherein the schedule is a broadcasting schedule, and the second apparatus comprises a broadcasting transmission apparatus.

8. The method of claim 1, wherein the first interworking information is at least one from among a verification code and a QR code.

9. A broadcasting service apparatus for synchronizing multiple devices with each other, the apparatus comprising:
   a generator which is configured to generate first interworking information corresponding to a first device that reproduces contents and configured to transmit the first interworking information to the first device;
   a device interworker which is configured to interwork the first device with a second device if second interworking information received at the broadcasting service apparatus, from the second device corresponds to the first interworking information; and
   a synchronizer which is configured to synchronize the first device with the second device,
   wherein the second device is configured to display first information comprising broadcasting related information generated based on a schedule provided by an apparatus that transmits contents to the first device,
   wherein the first interworking information and the second interworking information comprise at least one from among numbers, texts, and images, and
   wherein the transmitted first interworking information is displayed on the first device, and the second interworking information comprises the first interworking information displayed on the first device.

10. The apparatus of claim 9, wherein the device interworker is configured to operate the second device as a subsidiary device of the first device.

11. The apparatus of claim 9, wherein the synchronizer comprises:
   a receiver configured to receive a request for first information of contents being reproduced through the first device from the second device; and
   a provider configured to provide second information comprising the first information of the contents to the second device in response to the received request for the first information.

12. The apparatus of claim 11, wherein the first information comprises reproduction information and the second information comprises contents information.

13. The apparatus of claim 9, wherein the synchronizer comprises:
   a receiver configured to receive first information from the second device; and
   a transmitter configured to transmit a signal for controlling the first device, to the first device based on the received first information,
   wherein the transmitted signal allows the first device to reproduce contents corresponding to the received first information.

14. The apparatus of claim 13, wherein the first information comprises contents selection information and the signal is a control signal.

15. The apparatus of claim 9, wherein the contents comprises broadcasting contents, the schedule is a broadcasting schedule, and the apparatus comprises a broadcasting transmission apparatus.

16. The apparatus of claim 9, wherein the first interworking information is at least one from among a verification code and a QR code.

17. A system of interworking multiple devices with each other, the system comprising:
   a first device which displays first contents;
   a second device which displays second contents;
   a third device which generates first interworking information corresponding to the first device, transmits the generated first interworking information to the first device, the first interworking information being configured to be displayed by the first device, and receives second interworking information from the second device, the second interworking information being generated by the second device based on the displayed first interworking information; and
   a fourth device which transmits the first contents to the first device,
   wherein if the first interworking information corresponds to the second interworking information, the first device is interworked with the second device,
   wherein the second device is configured to display first information comprising broadcasting related information generated based on a schedule provided by the fourth device,
   wherein the system further comprises a fifth device connected to the third device, and
   wherein the third device transmits the schedule received from the fourth device, to the fifth device in response to a request of the fifth device, said third device and said fifth device being separate devices,
   wherein the first interworking information and the second interworking information comprise at least one from among numbers, texts, and images, and
   wherein the first information is generated by the fifth device.

18. The system according to claim 17, wherein the third device receives information related to contents included in the schedule from the fifth device and generates contents information of the contents by using the received information related to the contents.

19. The system according to claim 17, wherein the third device is a broadcasting service apparatus, the fourth device is a broadcasting transmission apparatus, and the fifth device is a broadcasting information generating apparatus.

20. The system according to claim 17, wherein the first interworking information is at least one from among a verification code and a QR code.

* * * * *